US 9,654,351 B2

(12) United States Patent
Seago (10) Patent No.: US 9,654,351 B2
(45) Date of Patent: May 16, 2017

(54) GRANULAR PERMISSION ASSIGNMENT (71) Applicant: Red Hat, Inc., Raleigh, NC (US)

(72) Inventor: Scott Wayne Seago, Warwick, MA (US)

(73) Assignee: Red Hat, Inc., Raleigh, NC (US)

( * ) Notice: Subject to any disclaimer, the term of this patent is extended or adjusted under 35 U.S.C. 154(b) by 478 days.

(21) Appl. No.: 13/973,671

(22) Filed: Aug. 22, 2013

(65) Prior Publication Data
US 2015/0058460 A1 Feb. 26, 2015

(51) Int. Cl.
G06F 15/173 (2006.01)
H04L 12/24 (2006.01)
H04L 29/06 (2006.01)

(52) U.S. Cl.
CPC ............ H04L 41/28 (2013.01); H04L 63/102 (2013.01)

(58) Field of Classification Search
CPC . G06F 2221/2141; G06F 21/62; H04L 41/28; H04L 63/102
USPC ........................................................ 709/223
See application file for complete search history.

(56) References Cited

U.S. PATENT DOCUMENTS

| | | | | |
|---|---|---|---|---|
| 2003/0229623 A1* | 12/2003 | Chang | ................. | G06F 21/6218 |
| 2007/0185875 A1* | 8/2007 | Chang | ................. | G06F 21/6218 |
| 2007/0250833 A1* | 10/2007 | Araujo, Jr. | .......... | G06F 21/6218 718/1 |
| 2007/0283443 A1* | 12/2007 | McPherson | ......... | G06F 21/6218 726/26 |
| 2009/0254572 A1* | 10/2009 | Redlich | .................. | G06Q 10/06 |
| 2010/0318609 A1* | 12/2010 | Lahiri | ................... | G06F 9/5072 709/205 |
| 2011/0191485 A1* | 8/2011 | Umbehocker | ...... | G06F 21/6218 709/229 |
| 2011/0258481 A1* | 10/2011 | Kern | .................. | G06F 11/1484 714/4.1 |

(Continued)

FOREIGN PATENT DOCUMENTS

CN 102904892 1/2013

OTHER PUBLICATIONS

Adaptive Computing "What's New-Cloud", 2012, retrieved from http://www.adaptivecomputing.com/products/cloud-products/moab-cloud-suite/whats-new/ Aug. 22, 2013, 2 pages.

(Continued)

Primary Examiner — June Sison
Assistant Examiner — Dixon Dabipi
(74) Attorney, Agent, or Firm — Lowenstein Sandler LLP (57) ABSTRACT

A system and method for storing role definitions for cloud provider systems, receiving a first request to assign a user to a first role specifying a first cloud computing resource of a respective resource type, identifying a role definition corresponding to the first role that includes an action set permitted, and creating the first role for the user on the first cloud computing resource by associating the identified role definition with the first cloud computing resource and the user. A second request to assign the user to a second role is received specifying a second cloud computing of the respective resource type, and the second role is created for the user on the second cloud computing resource, where the identified role definition corresponds to the first and second roles, and wherein creating the second role includes associating the identified role definition with the first cloud computing resource and the user.

20 Claims, 6 Drawing Sheets

(56) References Cited

U.S. PATENT DOCUMENTS

| | | |
|---|---|---|
| 2012/0102539 A1* | 4/2012 | Robb .................. G06F 21/6218 726/1 |
| 2012/0167197 A1 | 6/2012 | Kruger et al. |
| 2012/0331053 A1 | 12/2012 | Dunn |
| 2013/0073978 A1 | 3/2013 | Butler et al. |

OTHER PUBLICATIONS ownCloud forms, "How to Avoid Oversharing with ownCloud", Nov. 8, 2012, retrieved from https://owncloud.com/blog/how-to-avoid-oversharing-with-owncloud Aug. 22, 2013, 6 pages.

Alfresco> forums, "Granular Permissions", Jul. 17, 2012, retrieved from https://forums.alfresco.com/forum/end-user-discussions/alfresco-cloud/granular-permissions-07172012-1647 Aug. 22, 2013, 3 pages.

Egnyte® Hybrid Cloud, retrieved from http://www.egnyte.com/ms/egnyte-vs-box/, Aug. 22, 2013, 5 pages.

* cited by examiner

GRANULAR PERMISSION ASSIGNMENT

TECHNICAL FIELD

Embodiments of the present disclosure relate to permission assignment and, more particularly, to a technique of granular permission assignment.

BACKGROUND

Cloud computing is generally becoming the platform of choice for businesses that want to reduce operating expenses and be able to scale resources rapidly. Eased automation, flexibility, mobility, resiliency, and redundancy are several other advantages of moving resources to the cloud. Many organizations are being introduced to cloud computing by building an on-premise Infrastructure-as-a-Service (IaaS) cloud, which delivers computing, storage, and networking resources to users. Virtual machines in cloud computing are, for the most part, ephemeral. The state of a virtual machine is not persistent and is lost at shut down. A set of virtual machines can be launched with a particular configuration in a cloud one day and can be launched in a different cloud provider environment the next day. Administrators need to be able to efficiently assign access to different users and groups authorized to perform different action sets, while preventing access by unauthorized users.

BRIEF DESCRIPTION OF THE DRAWINGS

Various embodiments of the present disclosure will be understood more fully from the detailed description given below and from the accompanying drawings of various embodiments of the disclosure.

DETAILED DESCRIPTION

Embodiments of the disclosure are directed to a method and system for defining roles to assign certain permissions based on types of resource and actions that can be performed on these types of resources. In one embodiment, a resource type and an action set are received such that a computer server can define a role for the resource type based on the action set.

In one embodiment, the computer server receives a request to assign a user or a group of users to the role on a particular resource and assigns the user or the group to the role on the resource (e.g., a permission grant). A request from the user to perform an action from the action set can then be received, and the user is allowed to perform the action. For example, to create a new resource of a given type, a user needs a permission grant on a higher level resource that includes resource creation privileges (e.g., to create a file in a directory, the user would need a permission grant on that directory that included 'file creation' privileges). When a new resource is created, the system can be set up in such a way as to automatically grant a role on the new resource associated with ownership. In one embodiment, the group of users and/or the action can be updated. The resource could be a single disconnected object, or it could be a higher-level resource that allows action on child resources, as well. For example, certain permission grants on a host resource might include cascading permissions on virtual machines running on the host.

Embodiments of the disclosure provide reusable role definitions and individual and group based permission grants that allow expanded permission levels, rather than merely user and administrator roles, to provide more granularity in assigning permissions, either globally or to individual resources. For example, a role can be a collection of low level privileges (e.g., defined by an administrator) that are necessary for a particular user to perform a job. Further, rather than defining roles with respect to specific resources, the roles contain a set of actions that can be performed on resource types (e.g., generic resource types)

Embodiments of the disclosure provide a customizable framework (e.g., a plugin or engine) that can be incorporated into applications, such as web applications (e.g., Ruby on Rails), cloud computing applications, internal networks, content management systems, document archives, or any application having a hierarchy of permissions.

Figure 1:
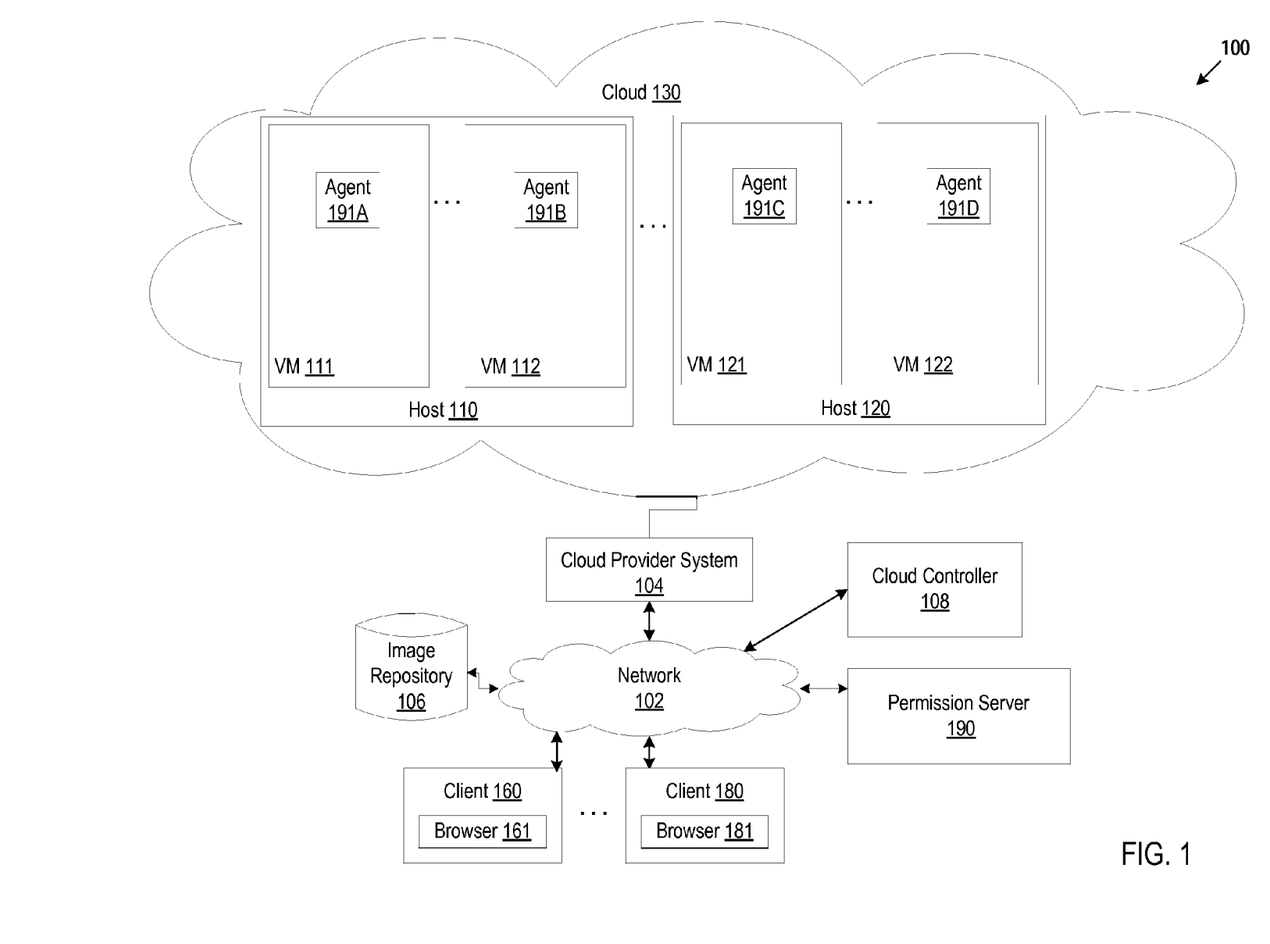
FIG. 1 illustrates exemplary system architecture, in accordance with various embodiments of the present disclosure.

FIG. 1 is a block diagram of a network architecture 100 for a distributed computing system, in which embodiments of the invention may operate. The network architecture 100 includes a cloud (a network of computing resources) 130 managed by a cloud provider system 104. In an embodiment, the network architecture 100 includes clouds from multiple cloud providers or hosts. The cloud 130 provides virtual machines, such as virtual machines 111, 112, 121, and 122. There can be any number of virtual machines in a cloud 130. Each virtual machine is hosted on a physical machine configured as part of the cloud 130. Such physical machines are often located in a data center. For example, virtual machines 111 and 112 are hosted on host 110 in cloud 130 provided by cloud provider 104, and virtual machines 121 and 122 are hosted on host 120 in cloud 130 provided by cloud provider 104. The cloud provider system 104 and cloud 130 may be provided as an infrastructure as a service (IaaS) layer. The cloud provider system 104 and cloud 130 may be provided by, for example, a third party cloud provider or an organization including consumers of cloud 130. Users can interact with applications executing on cloud-based virtual machines using client computer systems, such as clients 160, 180, via corresponding web browser programs 161, 181. Users may have one or more accounts associated with a cloud provider system 104.

Clients 160, 180 are connected to hosts 110, 120 and the cloud provider system 104 via a network 102, which may be may be a private network (e.g., a local area network (LAN), a wide area network (WAN), intranet, or other similar private networks) or a public network (e.g., the Internet). Each client 160, 180 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 and a permission server 190 via the network 102. The cloud controller 108 and permission server 190 may reside on the same machine or different machines (e.g., server computers, desktop computers, etc.). The cloud controller 108 and permission server 190 may be maintained by a cloud consumer of cloud 130, such as an enterprise (e.g., business, company). In another embodiment, the cloud controller 108 and permission server 190 may be maintained by a third party cloud provider. In yet another embodiment, the cloud controller 108 and/or permission server 190 may be part of the cloud provider system 104.

The cloud controller 108 may manage the execution of applications in the cloud 130. The cloud controller 108 may receive input, for example, from a system administrator via a client 160, 180, describing VMs 111, 112, 121, 122 to be deployed in the cloud 130 for execution of the applications. A VM may execute one or more applications. Alternatively, several VMs may be used to execute a single application (a composite application), with each virtual machine executing one or more components of a composite application. An image repository 106 can be populated with application deployment data to be used to deploy the VMs 111, 112, 121, 122. In one embodiment, the cloud controller 108 generates the application deployment data based on the user input and stores the application deployment data in the image repository 106. The repository 106 may reside on the same machine as cloud controller 108 or a different machine (coupled to the cloud controller 108 via network 102), and may represent a single data structure or multiple data structures (databases, repositories, files, etc.) residing on one or more mass storage devices, such as magnetic or optical storage based disks, solid-state drives (SSDs) or hard drives.

The application deployment data can be described in a structured format that specifies the bootable operating system, any software requirements, pre-set configuration data, and additional configuration parameters which must be defined by the user at launch time. Configuration can include any information that might vary on a per-instance basis, such as hostname, locations of related servers (i.e. database servers, backup systems, etc), or other customizations, to instantiate a virtual machine. The application deployment data can be a hierarchy of data that includes deployables, assemblies, and templates. Each deployable describes an overview of one or more virtual machines to be deployed as a group. A deployable can describe a deployment of any number of arbitrarily large and complex deployments of virtual machines or a small number of virtual machines. For brevity and simplicity, a deployment of four virtual machines is used as an example in architecture 100. A deployable can be described by an XML file.

An assembly is a description of a virtual machine to be deployed. An assembly can be described by an XML file. An assembly can include the description of a service to be provided by a virtual machine, the description of a service to be used by a virtual machine, and the description of one or more parameter values provided by or relied upon by a virtual machine.

An image template refers to a description of a disk image and meta-data for creating an application or virtual machine image. A virtual machine image can be created based on a template. A virtual machine image can be launched to instantiate (create) a virtual machine in a cloud. The template can be described by an XML file.

A cloud server (or deployment) may include one or more virtual machines designated to provide certain functionality. In one embodiment, the permission server 190 can define roles to assign certain permissions for users based on types of resource and actions that can be performed on these types of resources. For example, the permission server 190 can receive a resource type and an action set from an administrator to define a role for the resource type based on the action set. Once the role has been defined, the permission server 190 can receive a request to assign a user or a group of users to the role on a particular resource, and then assign the user or the group to the role on the resource to create a permission grant. One of the assigned users can then send a request to the permission server 190 to perform an action from the action set. If the user is allowed to perform the action based on the defined role, then the permission server 190 can permit the user to perform the action.

Upon receiving a command identifying a specific deployable to launch, the cloud provider system 104 retrieves a reference to the existing image for each virtual machine available to be run/cloned on top of a hypervisor. If the image is not in the image repository 106, other elements of the stack may be used to place the image in the repository 106. The command may be received from the cloud controller 108 or a user (e.g., a system administrator) via a console computer or a client machine. The images can be launched in the cloud 130 to instantiate the virtual machines 111, 112, 121, 122 for the deployable. Launch of a virtual machine can include powering on or booting a virtual machine. When a virtual machine image is launched (e.g., powered-on, booted) on a host in the cloud 130, agent 191A-D executes in a corresponding virtual machine 111, 112, 121, 122.

Figure 2:
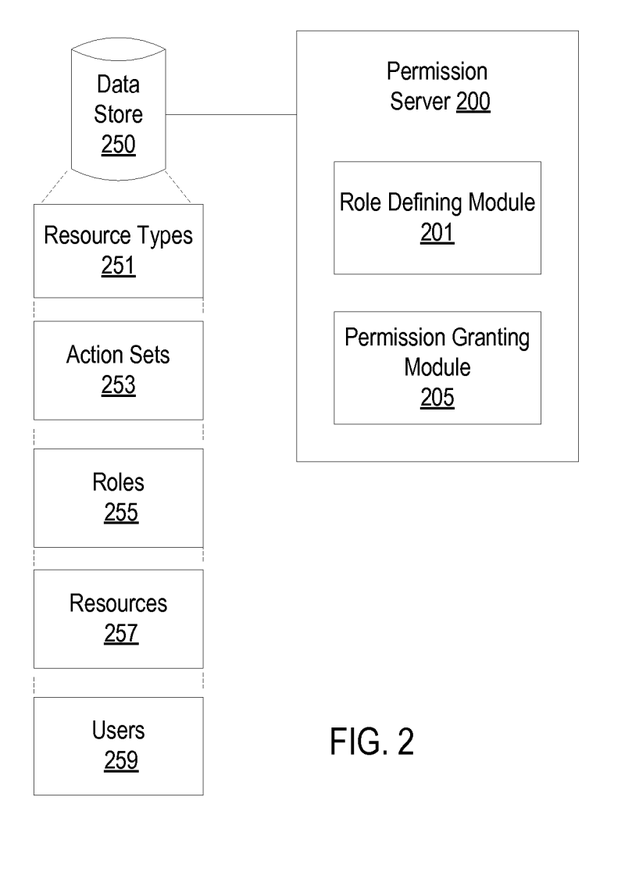
FIG. 2 is a block diagram of a permission server, in accordance with an embodiment.

FIG. 2 illustrates a block diagram of one embodiment of permission server 200. In one embodiment, the permission server 200 can be the same as the permission server 190 of FIG. 1. Permission server 200 includes a role defining module 201 and a permission granting module 205. Note that in alternative embodiments, the role defining module 201 and permission granting module 205 may be combined into a single module. Additionally, the functionality of any of the role defining module 201 and permission granting module 205 may be divided between multiple modules.

In one embodiment, the role defining module 201 identifies or receives (e.g., from a user or administrator) a resource type 251 from a data store 250. For example, resource types can be: environments, instances, applications, deployments, and catalogs, with respect to cloud computing. However, the permission server 200 can be define roles in other applications where there is a hierarchy of permissions. For example, resources types can be: documents and sections, with respect to document archives; pages, graphics, video, audio, code, and websites, with respect to content management systems, or trouble tickets, software bug, desired features, user requests, and user comments, with respect to a software and bug tracking system.

In an example for cloud computing, the role defining module 201 receives "environment" as a resource type. In an example for a document archive, the role defining module 201 receives "section" as a resource type. In yet another example, the role defining 201 receives "page" as a resource type.

The role defining module 201 also identifies or receives an action set 253 from the data store 250. For example, actions for cloud computing can include: view, modify, create, delete, edit, assign permissions, start a virtual machine, and stop a virtual machine. Examples of actions for document archives include: read, modify, create, add, delete, edit, and copy. Examples of actions for content management systems include: upload, download, modify, link, publish, view, and delete. Examples of a bug tracking system include: report bug, modify bug report, close bug report, and delete bug report.

Further to the cloud computing example above, the role defining module 201 receives actions including "view environment", "modify environment", "create services and instances within the environment", "view services and instances within the environment", and "modify services and instances within the environment". In an example for a document archive, the role defining module 201 receives actions including "read section", "modify section", "read documents within the section", "modify documents within the section", and "create documents within the section". In yet another example, the role defining 201 receives actions including "view" and "download".

The role defining module 201 can then define a role 255, which can be stored in the data store 250, for the resource type based on the action set. Here, the role defining module 200 can associate the actions in the action set 253 with the resource type 251. Therefore, the actions in the action set 253 can be performed on the resource type 251.

In the cloud computing example above, the role defining module 201 can define a role, e.g., an environment admin role, where, when the role is assigned to a user, the user is able to view an environment, modify the environment, create services and instances within the environment, view services and instances within the environment, and modify services and instances within the environment.

In the document archive example above, the role defining module 201 can define a role, e.g., a section editor role, where, when the role is assigned to a user, the user is able to read a section, modify the section, read documents within the section, modify documents within the section, and create documents within the section.

In the content management example above, the role defining module 201 can define a role, e.g., a user role, where, when the role is assigned to a user, the user is able to view a page and download the page.

The permission granting module 205 can then receive a user assignment, e.g., from an administrator, assigning a user 259 (or a group of users) from the data store 250 to the role 255 on a resource 257 from the data store 250. Here, the resource 257 is a particular resource from the resource type defined in the role. For example, the permission granting module 205 can assign the role 255 to a user 259 on the resource 257 based on the user assignment. The user assigning module 205 can also assign a group of users to the role 255. The group can be defined as a list of individuals, membership in certain group lists, by job title, by department, etc.

Further to the cloud computing example above, User A can be assigned to the environment admin role for a production environment by the permission granting module 205 such that User A can then view the production environment, modify the production environment, create services and instances within the production environment, view services and instances within the production environment, and modify services and instances within the production environment.

Further to the document archive example above, User B can be assigned to the document editor role for a human resources policies section by the user assigning module 205 such that User B can then view the read a section, modify the section, read documents within the section, modify documents within the section, and create documents within the section.

Further to the content management example above, User C can be assigned to the user role for a "tip and tricks" content section by the user assigning module 205 such that User C can then view a page and download a page.

For the cloud computing example, a zone administrator permission level can be introduced to allow a subset of permissions, where a zone is a particular grouping of clouds and the permissions are applicable with respect to specific objects (e.g., deployables).

In one embodiment, a global administrator generally has permission to perform all actions, but the ability to grant and revoke permissions can be controlled in the roles. For example, an administrator for a section for a document archive can edit and grant/revoke access to others, while an editor can modify, but not grant or revoke access. In another example for cloud computing, an owner (i.e., creator) of a virtual machine can grant/revoke access to the virtual machine. Here, the global administrator can restart virtual machines that have crashed and does not need to contact owner, but the owner can take care of the virtual machine without having to bother the global administrator.

Default roles can be defined for owners, such that the owner gets certain permission grants upon creation of a resource. Other permissions can then be added for other users later. For example, the owner may be able to giver others permission to edit, or the owner may allow viewing but not let others edit. For example, check boxes presented at the creation of a new resource may be used to grant permissions, assign roles, and assign groups. In a cloud computing example, a host owner has permissions to modify and configure virtual machines running on the host, while a user running a virtual machine can only start or stop the virtual machine.

Also, role definition and permission assignment options can be less limited to be more flexible or more limited to provide more safety with respect to preventing loss of access. For example, a user can take away the user's own permission to perform an action, but may be required to grant another user full permission first.

In one embodiment, a role providing access to a resource type inherits access to other resource types. In a document archive example where one of the resource types was a content page and another resource type was a content section, when determining whether a user has permission to view a particular page, permission for the section in which the page resides should also be determined. In other words, by having permission to view the section, the user can also have permission to view pages in the section. Further, if determining permission for a content section, permission for pages in the section should also be determined. In a cloud computing example where four virtual machines are in a group, to determine whether a user has permission to modify a particular one of the virtual machines, permission with respect to that virtual machine should be determined and permission with respect to the group should also be determined.

Figure 3:
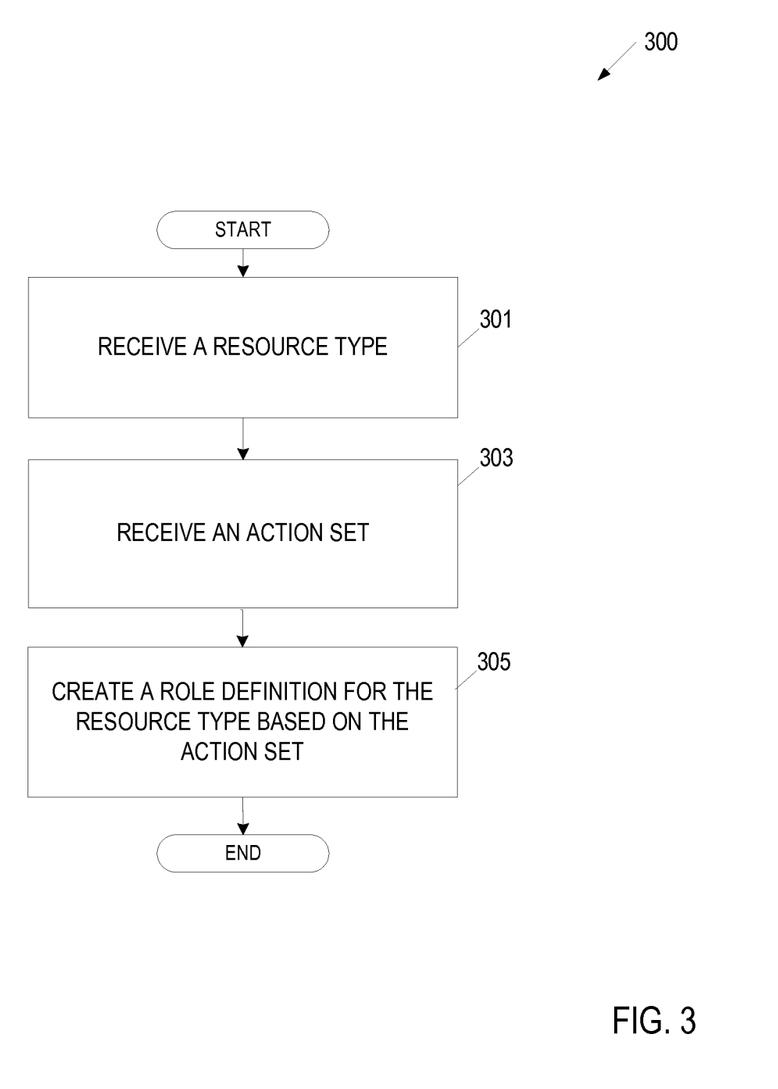
FIG. 3 is a flow diagram illustrating an embodiment of a method of defining roles.

FIG. 3 is a flow diagram of an embodiment of a method 300 of defining roles. The method 300 is performed by processing logic that may comprise hardware (circuitry, dedicated logic, etc.), software (such as is run on a general purpose computer system or a dedicated machine), or a combination of both. In one embodiment, the method 300 is performed by the permission server 200 of FIG. 2.

In block 301, a permission server can define a resource type (based on user input). For example, resource types can be environments, instances, applications, deployments, and catalogs with respect to cloud computing. However, resources types can be documents and sections for document archives, or pages, graphics, video, audio, code, and websites for content management systems. The permission server may provide a user interface presenting different resource types to a user and allowing the user to select one or more resource types.

In block 303, the permission server can define an action set (based on user input). For example, actions for cloud computing can include: view, modify, create, delete, edit, assign permissions, start a virtual machine, and stop a virtual machine. Examples of actions for document archives include: read, modify, create, add, delete, edit, and copy. Examples of actions for content management systems include: upload, download, modify, link, publish, view, and delete. The permission server may provide a user interface presenting different actions to a user and allowing the user to select a set of actions from the presented actions.

In block 305, the permission server can create a role definition for the resource type based on the action set. In a cloud computing example, the permission server can create a role definition, e.g., an environment admin role, where, when the role is assigned to a user, the user is able to view an environment, modify the environment, create services and instances within the environment, view services and instances within the environment, and modify services and instances within the environment.

In a document archive example, the permission server can create a role definition, e.g., a document editor role, where, when the role is assigned to a user, the user is able to read a document and modify the document.

In a content management example, the permission server can create a role definition, e.g., an editor role, where, when the role is assigned to a user, the user is able to view a page, edit the page, and download the page.

The permission server may store a definition of the role in a data store. The permission server can also provide a user interface presenting existing role definitions to a user, and allowing the user to re-use an existing role definition or to create a new role definition as discussed above. For example, if a user would like to permit a different set of actions (e.g., an expanded set of actions, a reduced set of actions, etc.) with respect to a resource type than what is currently covered by existing role definitions, the permission server can allow the user to create a new role definition.

Figure 4A:
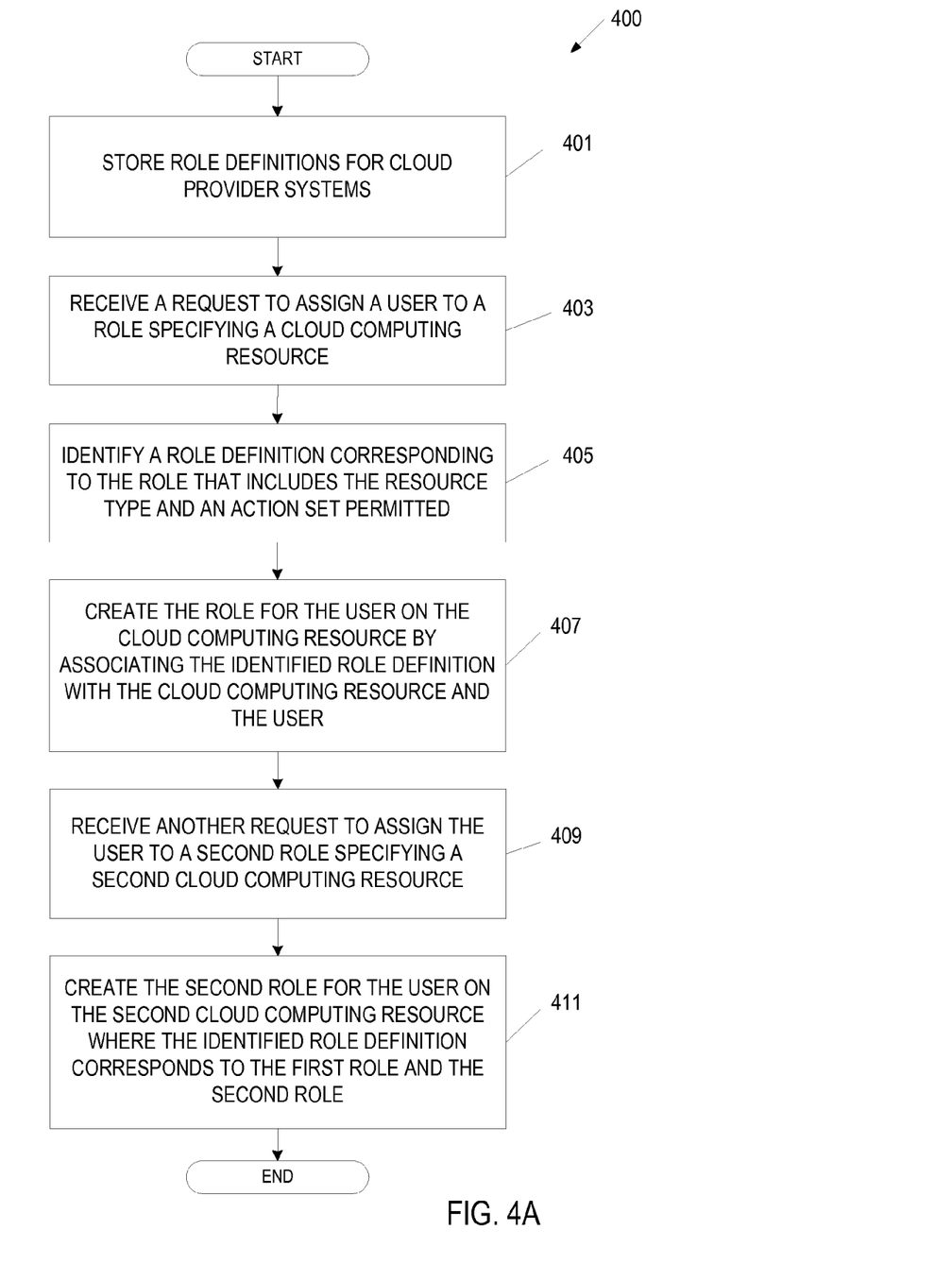
FIG. 4A is a flow diagram illustrating an embodiment of a method of assigning role to users on particular resources.

FIG. 4A is a flow diagram of an embodiment of another method 400 for assigning roles to users on resources (or creating permission grants). The method 400 is performed by processing logic that may comprise hardware (circuitry, dedicated logic, etc.), software (such as is run on a general purpose computer system or a dedicated machine), or a combination of both. In one embodiment, the method 400 is performed by the permission server 200 of FIG. 2.

In block 401, the permission server can store role definitions for cloud provider systems. In block 403, the permission server can receive a request to assign a user to a role specifying a cloud computing resource. The user could be an individual user or a group of users (e.g., a development team, users with a certain job title, etc.). In one example, the request identifies a specific role and the resource, and the permission server can verify, based on a respective role definition, that the type of the resource is covered by the identified role. Alternatively, the request can specify the resource and a desired set of actions to be allowed on the resource, and the permission server can determine the type of the resource and find an existing role covering that type of the resource and the desired set of actions.

In block 405, the permission server can identify a role definition corresponding to the role that includes the resource type and an action set permitted. In block 407, the permission server can create the role for the user on the cloud computing resource by associating the identified role definition with the cloud computing resource and the user. The role can be stored in a data store with a corresponding role definition ID, user ID and resource ID. Further to the cloud computing example above, User D can be assigned to the environment admin role for the development environment by the permission server such that User D can then view the development environment, modify the development environment, create services and instances within the development environment, view services and instances within the development environment, and modify services and instances within the development environment.

In one embodiment, a zone administrator permission level can be introduced to allow a subset of permissions, where a zone is a particular grouping (e.g., of clouds) and the permissions are applicable with respect to specific objects (e.g., deployables).

In block 409, the permission server can receive another request to assign the user to a second role specifying a second cloud computing resource. In block 411, the permission server can create the second role for the user on the second cloud computing resource where the identified role definition corresponds to the first role and the second role. Creating the second role can include associating the identified role definition with the first cloud computing resource and the user. The second role can be stored in a data store with a corresponding role definition ID, user ID and resource ID.

Figure 4B:
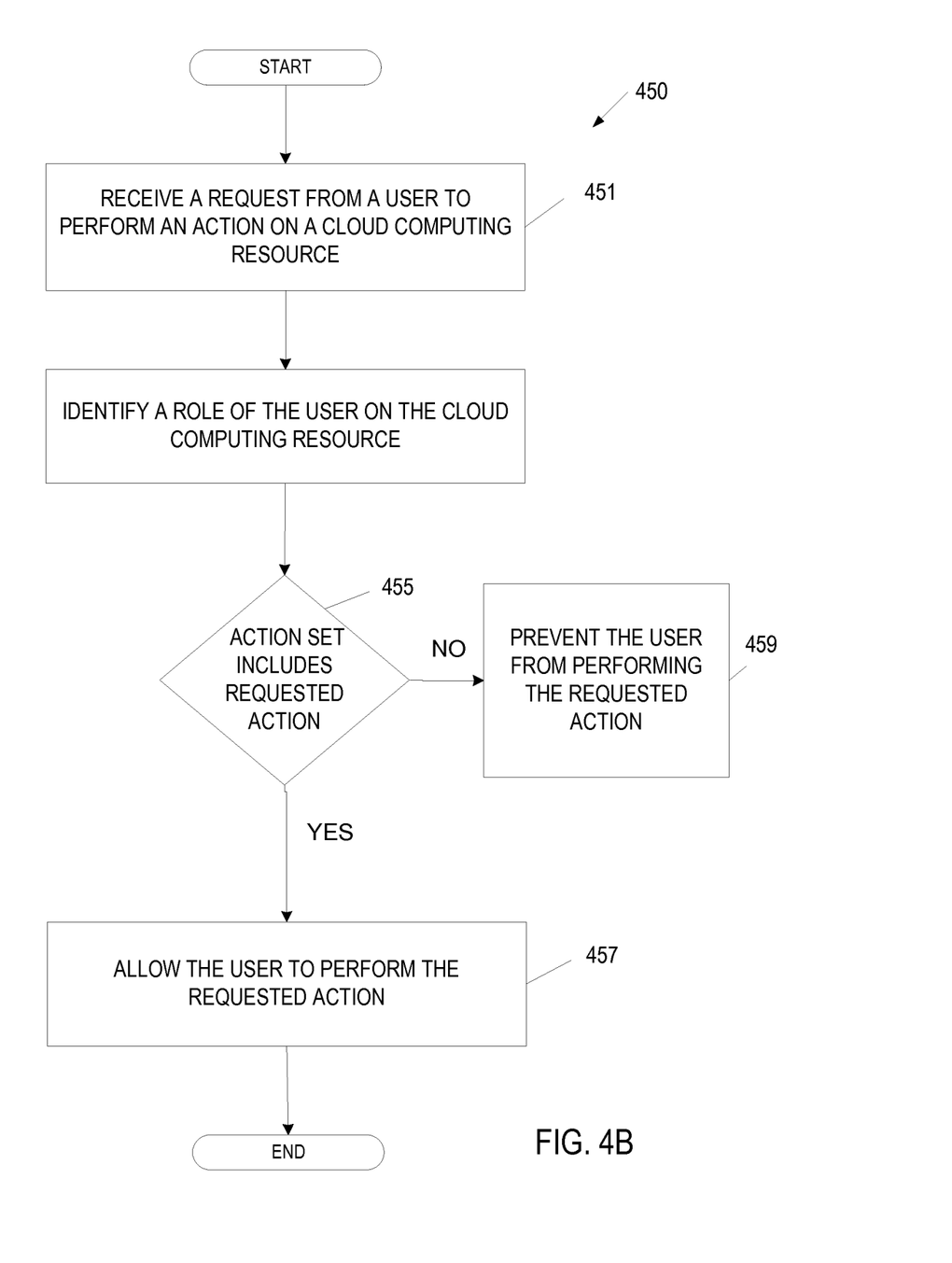
FIG. 4B is a flow diagram illustrating an embodiment of a method of determining whether an action by a user is allowed.

FIG. 4B is a flow diagram of an embodiment of another method 450 for determining whether an action by a user is allowed. The method 450 is performed by processing logic that may comprise hardware (circuitry, dedicated logic, etc.), software (such as is run on a general purpose computer system or a dedicated machine), or a combination of both. In one embodiment, the method 450 is performed by the permission server 200 of FIG. 2.

In block 451, the permission server can receive a request from a user to perform an action on a cloud computing resource. In block 453, the permission server can identify a role of the user on the cloud computing resource. In block 455, the permission server can determine whether a role definition of the role has an action set that includes the requested action. In block 457, the permission server can allow the user to perform the action if the action is included in the role definition. In block 459, the permission server can prevent the user from performing the requested action if the action is not included in the role definition.

Further to the cloud computing example above, if User D requests permission to modify the development environment, the permission server will allow the User D to modify the development environment, because the role is assigned to User D, modifying the environment is an action that is included in the role definition for this role, and the resource the role is assigned to is the development environment.

In one example, a group of users can be defined by a list, an organization, a team, a function, or a title. Further, a user can be added or removed to a group, which will add or remove permissions from the user. For example, an application programming interface can retrieve a list of groups to which the user belongs. Granting a role to a group is similar to granting the role to users one at a time. In one example, in one step, a group of three users can be assigned to a role with four actions. In another example, a permission or role can be added to a group so that all of the users in the group receive the permission or role.

In one example for cloud computing, an administrator role is assigned to a team manager with a resource pool. User roles are assigned to individual users for their virtual machines. The user roles for each virtual machine could be owner roles that include numerous actions such as granting permissions to others, could just include the actions of start and stop for that virtual machine, or could include actions that allow some mid-level of control such as changing a name and modifying the virtual machine. Also, a mid-level manager role could be defined that included actions that would allow a manager to manage the team. According to embodiment, because the roles are customizable, permissions to perform actions can be optimized for different situations.

In one example for content management, if a user attempts to edit a page, a permission check is performed to determine if user has permission to edit for that specific page. If a role has been assigned to the user that includes an edit action, then the user is allowed to edit the page. If no role has been assigned to the user that includes an edit action, then the user is denied the ability to edit the page.

In one embodiment, an administrator can view a summary page that includes the resources present. For example, a host can see all of the virtual machines running on the host. However, the list can be filtered for users to only show resources where the user has permissions.

In one embodiment, an administrator can query the permission server to determine which users can perform which actions. For example, the administrator can query the permission server to determine which users can perform edit actions.

Figure 5:
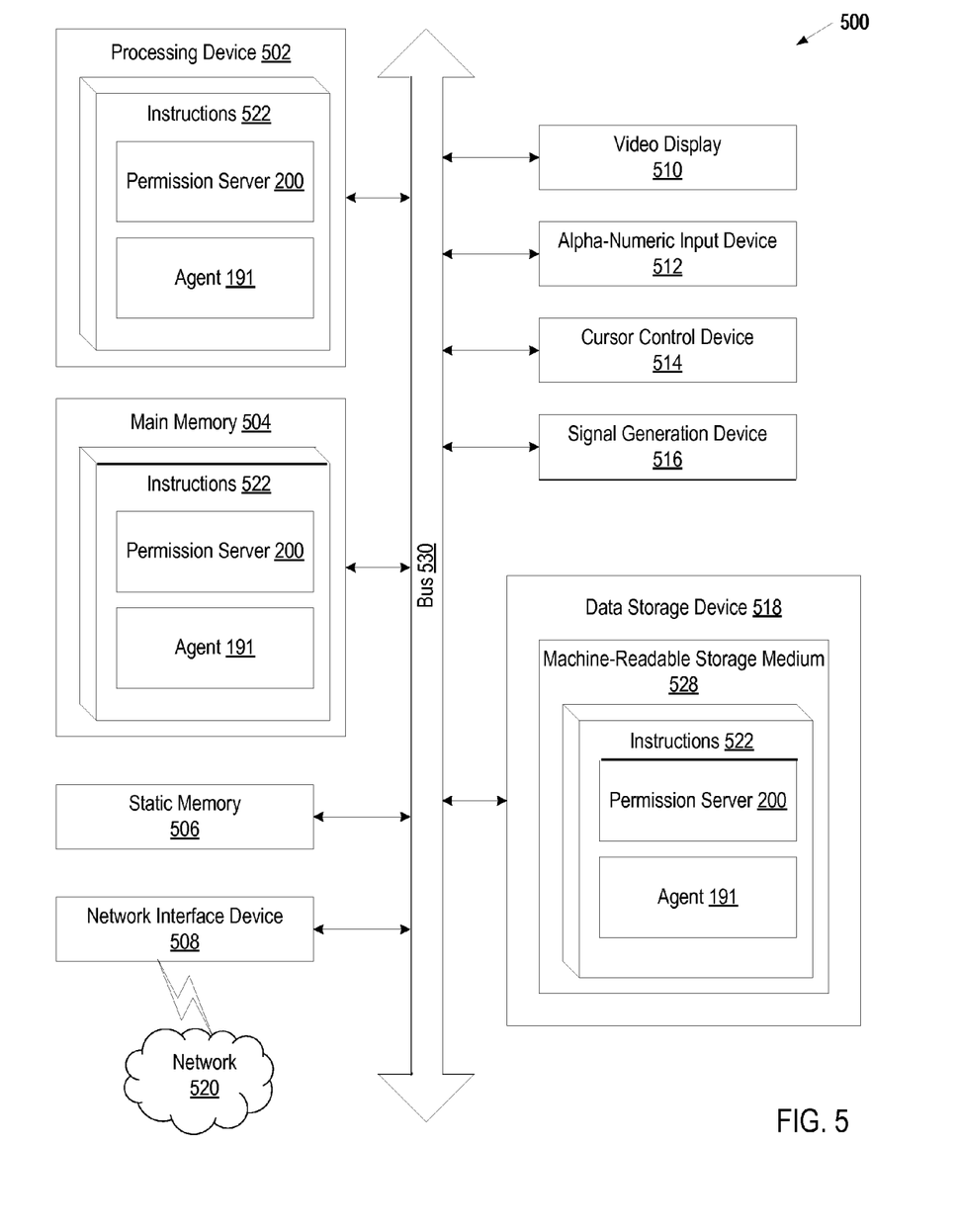
FIG. 5 is a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a permission server (e.g., permission server 200 of FIG. 2), an agent (e.g., agent 191A-D of FIG. 1) and/or a software library containing methods that call a template sharing server and/or agent. While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "configuring", "searching", "sending," "receiving," "requesting," "providing," "generating," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

maintaining a data store to store a plurality of reusable role definitions for assigning roles to users with respect to resources in a system of a plurality of systems, the plurality of systems comprising a cloud provider system and a content management system;

creating, by a processing device, the plurality of reusable role definitions for the cloud provider system, wherein each of the plurality of reusable role definitions comprises a resource type and an action set permitted to be performed on a plurality of resources of the resource type;

storing the plurality of reusable role definitions in the data store;

receiving, by the processing device, a first request to assign a user to a first role, the first request specifying a first cloud computing resource of a plurality of cloud computing resources of a respective resource type in the e cloud provider system;

identifying, by the processing device, a role definition corresponding to the respective resource type in the data store storing the reusable role definitions, the identified role definition comprising the respective resource type and an action set permitted to be performed in the cloud provider system on the plurality of cloud computing resources of the respective resource type;

creating, by the processing device, the first role for the user on the first cloud computing resource, wherein creating the first role comprises associating the identified role definition with the first cloud computing resource and the user;

receiving, by the processing device, a second request to assign the user to a second role, the second request specifying a second cloud computing resource of the plurality of cloud computing resources of the respective resource type; and creating, by the processing device, the second role for the user on the second cloud computing resource in view of the identified role definition corresponding to the resource type, wherein the identified role definition that was used for the first role of the user is being reused for the second role of the user, and wherein creating the second role comprises associating the identified role definition with the second cloud computing resource and the user.

2. The method of claim 1 further comprising:

receiving a request from the user to perform an action on the first cloud computing resource;

identifying the first role of the user on the first cloud computing resource;

allowing the user to perform the requested action if a role definition of the first role has an action set comprising the requested action; and preventing the user from performing the requested action if the role definition of the first role does not include the requested action.

3. The method of claim 2, wherein the respective action set comprises one or more of view a resource, modify a resource, create services, delete services, assign permissions, start a virtual machine, or stop a virtual machine.

4. The method of claim 1 further comprising:

receiving a request to assign a group comprising a user set to the role on the first cloud computing resource;

assigning the group to the role on the first cloud computing resource;

receiving a request from a user of the user set to perform an action of a respective action set on the first cloud computing resource; and allowing the user of the user set to perform the action.

5. The method of claim 4 further comprising:

receiving an updated user set; and updating the group assigned to the role in view of the updated user set.

6. The method of claim 1 further comprising:

receiving an updated action set for the role; and updating the role in view of the updated action set.

7. The method of claim 1, wherein the respective resource type comprises an cloud computing environment, an instance in a cloud computing environment, an application in a cloud computing environment, a deployment in a cloud computing environment, or a catalog in a cloud computing environment.

8. A system comprising:

a memory to store instructions, the memory comprising a data store to store a plurality of reusable role definitions for assigning roles to users with respect to resources in a system of a plurality of systems, the plurality of systems comprising a cloud provider system and a content management system; and a processor, executing the instructions and coupled to the memory, to:

create the plurality of role definitions for cloud provider system, wherein each of the plurality of reusable role definitions comprises a resource type and an action set permitted to be performed on a plurality of resources of the resource type;

store the plurality of reusable role definitions in the data store;

receive a first request to assign a user to a first role, the first request specifying a first cloud computing resource of a plurality of cloud computing resources of a respective resource type in the cloud provider system;

identify a role definition corresponding to the respective resource type in the data store storing the reusable role definitions, the identified role definition comprising the respective resource type and an action set permitted to be performed in the cloud provider system on the plurality of cloud computing resources of the respective resource type;

create the first role for the user on the first cloud computing resource, wherein creating the first role comprises associating the identified role definition with the first cloud computing resource and the user;

receive a second request to assign the user to a second role, the second request specifying a second cloud computing resource of the plurality of cloud computing resources of the respective resource type; and create the second role for the user on the second cloud computing resource in view of the identified role definition corresponding to the resource type, wherein the identified role definition that was used for the first role of the user is being reused for the second role of the user, and wherein creating the second role comprises associating the identified role definition with the second cloud computing resource and the user.

9. The system of claim 8, wherein the processor is further to:

receive a request from the user to perform an action on the first cloud computing resource;

identify the first role of the user on the first cloud computing resource;

allow the user to perform the requested action if a role definition of the first role has an action set comprising the requested action; and prevent the user from performing the requested action if the role definition of the first role does not include the requested action.

10. The system of claim 9, wherein the respective action set comprises one or more of view a resource, modify a resource, create services, delete services, assign permissions, start a virtual machine, or stop a virtual machine.

11. The system of claim 8, wherein the processor is further to:

receive a request to assign a group comprising a user set to the role on the first cloud computing resource;

assign the group to the role on the first cloud computing resource;

receive a request from a user of the user set to perform an action of a respective action set on the first cloud computing resource; and allow the user of the user set to perform the action.

12. The system of claim 11, wherein the processor is further to:

receive an updated user set; and update the group assigned to the role in view of the updated user set.

13. The system of claim 8, wherein the processor is further to:

receive an updated action set for the role; and update the role in view of the updated action set.

14. The system of claim 8, wherein the respective resource type comprises an cloud computing environment, an instance in a cloud computing environment, an application in a cloud computing environment, a deployment in a cloud computing environment, or a catalog in a cloud computing environment.

15. A non-transitory computer-readable storage medium including instructions that, when executed by a computer server, cause the computer server to perform a set of operations comprising:

maintaining a data store to store a plurality of reusable role definitions for assigning roles to users with respect to resources in a system of a plurality of systems, the plurality of systems comprising a cloud provider system and a content management system;

s creating the plurality of reusable role definitions for the cloud provider system, wherein each of the plurality of reusable role definitions comprises a resource type and an action set permitted to be performed on a plurality of resources of the resource type;

storing the plurality of reusable role definitions in the data store;

receiving a first request to assign a user to a first role, the first request specifying a first cloud computing resource of a plurality of cloud computing resources of a respective resource type in the e cloud provider system;

identifying a role definition corresponding to the respective resource type in the data store storing the reusable role definitions, the identified role definition comprising the respective resource type and an action set permitted to be performed in the cloud provider system on the plurality of cloud computing resources of the respective resource type;

creating the first role for the user on the first cloud computing resource, wherein creating the first role comprises associating the identified role definition with the first cloud computing resource and the user;

receiving a second request to assign the user to a second role, the second request specifying a second cloud computing resource of the plurality of cloud computing resources of the respective resource type; and creating the second role for the user on the second cloud computing resource in view of the identified role definition corresponding to the resource type, wherein the identified role definition that was used for the first role of the user is being reused for the second role of the user, and wherein creating the second role comprises associating the identified role definition with the second cloud computing resource and the user.

16. The non-transitory computer-readable storage medium of claim 15, wherein the operations further comprise:

receiving a request from the user to perform an action on the first cloud computing resource;

identifying the first role of the user on the first cloud computing resource;

allowing the user to perform the requested action if a role definition of the first role has an action set comprising the requested action; and preventing the user from performing the requested action if the role definition of the first role does not include the requested action.

17. The non-transitory computer-readable storage medium of claim 15, wherein a respective action set comprises one or more of view a resource, modify a resource, create services, delete services, assign permissions, start a virtual machine, or stop a virtual machine.

18. The non-transitory computer-readable storage medium of claim 15, wherein the operations further comprise:
   receiving a request to assign a group comprising a user set to the role on the first cloud computing resource;
   assigning the group to the role on the first cloud computing resource;
   receiving a request from a user of the user set to perform an action of a respective action set on the first cloud computing resource; and
   allowing the user of the user set to perform the action.

19. The non-transitory computer-readable storage medium of claim 15, wherein the operations further comprise
   receiving an updated user set; and
   updating the group assigned to the role in view of the updated user set.

20. The non-transitory computer-readable storage medium of claim 15, wherein the respective resource type comprises an cloud computing environment, an instance in a cloud computing environment, an application in a cloud computing environment, a deployment in a cloud computing environment, or a catalog in a cloud computing environment.

* * * * *